US012790438B2

(12) United States Patent
Pineau et al.

(10) Patent No.: US 12,790,438 B2
(45) Date of Patent: Nov. 10, 2026

(54) POLYAMIDE COMPOSITION FOR MATERIAL

(71) Applicant: ARKEMA FRANCE, Colombes (FR)

(72) Inventors: Quentin Pineau, Serquigny (FR); Stefania Cassiano Gaspar, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 562 days.

(21) Appl. No.: 18/284,047

(22) PCT Filed: Mar. 24, 2022

(86) PCT No.: PCT/FR2022/050547
§ 371 (c)(1),
(2) Date: Sep. 25, 2023

(87) PCT Pub. No.: WO2022/200738
PCT Pub. Date: Sep. 29, 2022

(65) Prior Publication Data

US 2024/0158577 A1 May 16, 2024

(30) Foreign Application Priority Data

Mar. 26, 2021 (FR) ....................................... 2103065

(51) Int. Cl.

| | |
|---|---|
| ***C08G 69/14*** | (2006.01) |
| ***C08G 69/26*** | (2006.01) |
| ***C08G 69/40*** | (2006.01) |
| ***C08J 3/12*** | (2006.01) |
| ***C08K 3/105*** | (2018.01) |
| ***C08K 3/11*** | (2018.01) |

(52) U.S. Cl.
CPC ............ *C08G 69/14* (2013.01); *C08G 69/26* (2013.01); *C08G 69/40* (2013.01); *C08J 3/12* (2013.01); *C08K 3/105* (2018.01); *C08K 3/11* (2018.01); *C08J 2377/04* (2013.01); *C08J 2377/06* (2013.01); *C08K 2201/01* (2013.01)

(58) Field of Classification Search
CPC ........ C08G 69/14; C08G 69/26; C08G 69/40; C08G 69/08; C08G 69/36; C08J 3/12; C08J 2377/04; C08J 2377/06; C08J 3/226; C08K 3/105; C08K 3/11; C08K 2201/01; C08L 77/02; B29B 9/12
See application file for complete search history.

(56) References Cited

U.S. PATENT DOCUMENTS

2005/0245680 A1* 11/2005 Linemann ............. C08G 69/04 525/66
2015/0166736 A1* 6/2015 Pineau .................. C08G 69/26 424/70.6
2023/0383096 A1* 11/2023 Pineau ..................... C08K 7/18

FOREIGN PATENT DOCUMENTS

JP 2006344768 A 12/2006
WO 2014/050631 A1 8/2016

OTHER PUBLICATIONS

International Search Report (PCT/IDS/210) with English translation mailed on Jun. 14, 2022, by the European Patent Office as the Internal Searching Authority for International Application No. (PCT/FR2022/050547), 4 Pages.

* cited by examiner

*Primary Examiner* — Andrew J. Oyer
(74) *Attorney, Agent, or Firm* — Boone IP Law

(57) ABSTRACT

The present invention relates to a magnetic composite material characterized in that it comprises:
4% to 30% by weight of a copolymer,
70% to 96% by weight of magnetic powder,
0% to 5% by weight of at least one coupling agent,
0% to 5% by weight of at least one additive,
where the sum of the copolymer, the magnetic powder, the coupling agent and the additive is 100% by weight, said copolymer consisting of:
at least one unit (A) chosen from a polyamide unit,
at least one monocarboxylic acid unit (B),
at least one diamine unit (C),
at least one triamine unit (D),
optionally at least one polyetheramide unit (E),
where the sum of the constituents A, B, C, D and E is 100% by weight relative to the total weight of the copolymer.

19 Claims, No Drawings

POLYAMIDE COMPOSITION FOR MATERIAL

TECHNICAL FIELD

The present invention relates to compositions for magnetic composite materials and to the composite materials as such.

PRIOR ART

Magnetic composite materials are increasingly being used especially in automotive vehicles as sensors, automobile alternators, dynamos or magnetos, in the electrical and electronic systems, as a speaker or microphone, and in telephony as a telephone charger.

Compositions for magnetic materials are already known and involve mixtures of polyamide and magnetic fillers in powder form, with the magnetic fillers being greatly in the majority.

Producing a composition containing a polyamide resin with a large amount of magnetic powder therefore entails mixing a large amount of magnetic powder with a composition containing the melted polyamide resin. A very sharp increase in viscosity is observed, nevertheless, which may make processing impossible, and, moreover, the mixture of polyamide and magnetic powder has the drawback of being unstable.

This changeability has been linked to the acid and/or amine chain ends of polyamides, and so the strategy has been to decrease this content by using monofunctional chain transfer agent such as stearic acid.

This strategy has two disadvantages: the polyamides must have limited molecular masses in order to remain fluid, and the materials with magnetic fillers are fragile.

International patent application WO2014050631 attempted to solve this problem by using 2 types of chain transfer agent, making the mixture more stable, to give a composition comprising a polyamide resin wherein the concentration of terminal amino groups and the concentration of terminal carboxyl groups in the polyamide resin are from 10 μeq/g to 40 μeq/g.

This second strategy allows a small increase in the molecular masses, but the ductility of the final mixture has to be improved.

There is therefore a need to find new compositions for magnetic materials that allow these various problems to be overcome and this is therefore the object of the present invention, which relates to a magnetic composite material characterized in that it comprises:

4% to 30% by weight of a copolymer,

70% to 96% by weight of magnetic powder,

0% to 5% by weight of at least one coupling agent,

0% to 5% by weight of at least one additive, where the sum of the copolymer, the magnetic powder, the coupling agent and the additive is 100% by weight, said copolymer consisting of:

at least one unit (A) chosen from a polyamide unit, at least one monocarboxylic acid unit (B), at least one diamine unit (C), at least one triamine unit (D), optionally at least one polyetheramide unit (E), where the sum of the constituents A, B, C, D and E is 100% by weight relative to the total weight of the copolymer.

The inventors have thus surprisingly found that the mixture of a particular copolymer, comprising especially at least one monocarboxylic acid unit (B), at least one diamine unit (C) and at least one triamine unit (D), with a magnetic powder affords a magnetic material which benefits not only from being stable on mixing but also from exhibiting no sharp increase in viscosity on mixing, so enabling effective processing.

Moreover, the molecular masses of the polyamides are not limited and the resulting materials with magnetic fillers are ductile.

As Regards the Copolymer

The copolymer consists of at least one unit (A), at least one monocarboxylic acid unit (B), at least one diamine unit (C), at least one triamine unit (D), and optionally at least one polyetheramide unit (E).

The copolymer advantageously has an acid chain end content of less than 10 μeq/g.

The copolymer advantageously has an amine chain end content of less than 80 μeq/g.

The copolymer more advantageously has an acid chain end content of less than 10 μeq/g. and an amine chain end content of less than 80 μeq/g.

The acid and amine chain ends can be assayed by potentiometry or by NMR.

Assay of acid chain ends by assay of total acidity:

The acidity is measured according to the following method: 1 g of polyamide is dissolved in 80 ml of benzyl alcohol at high temperature. The sample is then cooled. Next, it is assayed by potentiometry using a Metrohm titrator (888 or 716) with a combined pH electrode, with a 0.02 N tetrabutylammonium hydroxide solution. The graph of potential as a function of volume gives a jump with an equivalent volume from which the acid chain ends are calculated by means of the following formula:

$$\text{Acid chain ends (meq/g)} = \frac{Veq \times [TBAOH]}{m} \quad \text{[Math 1]}$$

wherein

Veq denotes the equivalent volume obtained by means of the potentiometric assay, [TBAOH] denotes the concentration of tetrabutylammonium hydroxide solution, i.e. 0.02 N, m denotes the mass of the sample, i.e. 1 g.

This method assays the acid chain ends and the H3PO4 introduced into the composition. In knowledge of the amount of H3PO4 introduced into the composition, the proportion of acid chain ends is deduced therefrom.

Assay of amine chain ends:

The amine chain ends are assayed by potentiometry.

Unit A

Unit A is a semicrystalline or amorphous polyamide.

For the purposes of the invention, a semicrystalline polyamide denotes a polyamide having a glass transition temperature in DSC according to the standard ISO 11357-2:2013 and a melting point (Tm) in DSC according to the standard ISO 11357-3:2013.

For the purposes of the invention, an amorphous polyamide denotes a transparent amorphous polyamide having only a glass transition temperature (no melting point (Tm)), or a polyamide with very low crystallinity, having a glass transition temperature and a melting point such that the enthalpy of crystallization during the cooling step at a rate of 20 K/min in Differential Scanning Calorimetry (DSC) measured according to the standard ISO 11357-3:2013 is less than 30 J/g, in particular less than 20 J/g, preferably less than 15 J/g. The glass transition temperature (Tg) measured by DSC at a heating rate of 20 K/min according to the standard ISO 11357-1:2009 and ISO 11357-2:2013 for these polyamides is advantageously greater than 75 °C.

The nomenclature used to define the polyamides is described in the standard ISO 1874-1:2011 "Plastics—Polyamide (PA) moulding and extrusion materials—Part 1: Designation", in particular on page 3 (tables 1 and 2), and is well known to those skilled in the art.

The expression "polyamide" means a homopolyamide or a copolyamide. It is clearly understood that it may be a mixture of aliphatic polyamides.

The average number of carbon atoms relative to the nitrogen atom is greater than or equal to 6.

Advantageously, it is greater than or equal to 8.

In the case of a PAXY type homopolyamide, the number of carbon atoms per nitrogen atom is the mean of the X unit and the Y unit.

In the case of a copolyamide, the number of carbons per nitrogen is calculated according to the same principle. The calculation is made on a molar pro rata basis of the various amide units.

The polyamide unit is from the polycondensation of at least one lactam, or of at least one aminocarboxylic acid, or of at least one diamine with at least one dicarboxylic acid.

In a first embodiment:

In a first variant of this first embodiment, the semicrystalline polyamide is obtained from the polycondensation of at least one aminocarboxylic acid comprising from 6 to 18 carbon atoms, preferentially from 8 to 12 carbon atoms, more preferentially from 10 to 12 carbon atoms. It can therefore be chosen from 6-aminohexanoic acid, 7-aminoheptanoic acid, 8-aminooctanoic acid, 9-aminononanoic acid, 10-aminodecanoic acid, 11-aminoundecanoic acid and 12-aminododecanoic acid, 13-aminotridecanoic acid, 14-aminotetradecanoic acid, 15-aminopentadecanoic acid, 16-aminohexadecanoic acid, 17-aminoheptadecanoic acid and 18-aminooctadecanoic acid.

Preferentially, it is obtained from the polycondensation of a single aminocarboxylic acid.

In a second variant of this first embodiment, the semicrystalline polyamide is obtained from the polycondensation of at least one lactam comprising from 6 to 18 carbon atoms, preferentially from 8 to 12 carbon atoms, more preferentially from 10 to 12 carbon atoms.

Preferentially, it is obtained from the polycondensation of a single lactam.

In a third variant of this first embodiment, the semicrystalline polyamide is obtained from the polycondensation of at least one diamine comprising from 4 to 36 carbon atoms, advantageously from 6 to 18 carbon atoms, advantageously from 6 to 12 carbon atoms, advantageously from 10 to 12 carbon atoms and from at least one dicarboxylic acid comprising from 4 to 36 carbon atoms, advantageously from 6 to 18 carbon atoms, advantageously from 6 to 12 carbon atoms, advantageously from 8 to 12 carbon atoms.

The diamine used for obtaining this repeating unit XY may be an aliphatic or alkylaromatic diamine.

The aliphatic diamine has a linear main chain comprising at least 4 carbon atoms.

This linear main chain can, where appropriate, comprise one or more methyl and/or ethyl substituents; in said configuration, the term "branched aliphatic diamine" is used. In the case where the main chain comprises no substituent, the aliphatic diamine is termed "linear aliphatic diamine".

Whether or not it comprises methyl and/or ethyl substituents on the main chain, the aliphatic diamine used to obtain this repeating unit XY comprises from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then corresponds to the formula $H2N-(CH2)x-NH2$ and can be chosen for example from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecanediamine and octadecenediamine. The linear aliphatic diamines that have just been mentioned may all be biobased within the meaning of standard ASTM D6866.

When this diamine is a branched aliphatic diamine, it can in particular be 2-methylpentanediamine, 2-methyl-1,8-octanediamine or (2,2,4- or 2,4,4-) trimethylenehexanediamine.

The alkylaromatic diamine can be chosen from 1,3-xylylenediamine and 1,4-xylylenediamine.

The dicarboxylic acid may be chosen from linear or branched aliphatic dicarboxylic acids.

The dicarboxylic acid can be aliphatic, cycloaliphatic or aromatic.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20) and docosanedioic acid (22).

When the dicarboxylic acid is cycloaliphatic, it may comprise the following carbon backbones: norbornylmethane, cyclohexane, cyclohexylmethane, dicyclohexylmethane, dicyclohexylpropane, di(methylcyclohexyl) or di(methylcyclohexyl)propane.

When the dicarboxylic acid is aromatic, it can be chosen from terephthalic acid (denoted T), isophthalic acid (denoted I) and a naphthalenic acid (denoted N).

In a fourth variant of this first embodiment, the semicrystalline aliphatic polyamide is obtained from a mixture of these three variants.

The polyamide unit is advantageously from the polycondensation of at least one lactam, or of at least one aminocarboxylic acid, or of at least one aliphatic diamine with at least one aliphatic dicarboxylic acid.

Said polyamide is advantageously a semicrystalline aliphatic polyamide.

Said semicrystalline aliphatic polyamide is advantageously chosen from PA410, PA510, PA512, PA514, PA610, PA612, PA1010, PA1012, PA1212, PA1014, PA11 and PA12, more particularly PA1010, PA1012, PA1212, PA11 and PA12.

The semicrystalline aliphatic polyamide is advantageously chosen from PA6, PA66, PA11 and PA12 or a mixture thereof or a copolyamide thereof.

Advantageously, said semicrystalline aliphatic polyamide is chosen from PA11 and PA12, more particularly PA11.

Advantageously, a single semicrystalline polyamide is present in the composition.

Amorphous Polyamide

The amorphous polyamide is a polyamide of formula X1Y1 or W/XY in which:

W is an aliphatic repeating unit chosen from a unit obtained from the polycondensation of at least one amino acid, a unit obtained from the polycondensation of at least one lactam and a unit obtained from the polycondensation of at least one aliphatic diamine and at least one aliphatic diacid, X1 is at least one cycloaliphatic diamine, and Y1 is at least one dicarboxylic acid, said diacid being chosen from an aliphatic diacid, linear or branched, a cycloaliphatic diacid and an aromatic diacid, said diamine X1 and said diacid Y1 comprising from 4 to 36 carbon atoms, advantageously from 4 to 18 carbon atoms, advantageously from 6 to 18 carbon atoms, advantageously 5 from 6 to 14 carbon atoms.

The amorphous polyamide is advantageously a polyamide of formula W/XY. The constituent amino acid, lactam, diamine and dicarboxylic acid of the unit W are as defined for the above-defined semicrystalline aliphatic polyamide.

The amorphous polyamide may be a homopolyamide or a copolyamide.

The molar proportions of diamine X1 and of dicarboxylic acid Y1 are preferentially stoichiometric.

The cycloaliphatic diamine X1 can be chosen for example from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane or 3'-dimethyl-4,4'-diaminodicyclohexylmethane commonly referred to as "BMACM" or "MACM" (and denoted B hereinafter), p-bis(aminocyclohexyl)methane commonly referred to as "PACM" (and denoted P hereinafter), isopropylidenedi(cyclohexylamine) commonly referred to as "PACP", isophoronediamine (denoted IPD hereinafter) and 2,6-bis(aminomethyl)norbornane commonly referred to as "BAMN".

A nonexhaustive list of these cycloaliphatic diamines is given in the publication "Cycloaliphatic Amines" (Encyclopedia of Chemical Technology, Kirk-Othmer, 4th Edition (1992), pages 386-405).

The dicarboxylic acid Y1 can be chosen from linear or branched aliphatic dicarboxylic acids, cycloaliphatic dicarboxylic acids and aromatic dicarboxylic acids.

When the dicarboxylic acid Y1 is aliphatic and linear, it is as defined above for the diacid Y.

When the dicarboxylic acid Y1 is cycloaliphatic, it may comprise the following carbon backbones: norbornylmethane, cyclohexane, cyclohexylmethane, dicyclohexylmethane, dicyclohexylpropane, di(methylcyclohexyl) or di(methylcyclohexyl)propane.

When the dicarboxylic acid Y1 is aromatic, it can be chosen from terephthalic acid (denoted T), isophthalic acid (denoted I) and a naphthalenic acid.

Advantageously, the dicarboxylic acid Y1 is aromatic, and it can be chosen from terephthalic acid (denoted T) and isophthalic acid (denoted I).

Advantageously, the amorphous polyamide is partially or totally biobased.

Advantageously, the amorphous polyamide is chosen from 11/B10, 12/B10, 11/P10, 12/P10, 11/BI/BT, 12/13I/BT, 11/PI/BT, 12/PI/BT, 11/PI/PT, 12/PI/PT, 11/BI, 12/BI, 11/PI and 12/PI, especially 11/B10.

Monocarboxylic Acid Unit B

The monocarboxylic acid may be an aliphatic monocarboxylic acid, an alicyclic acid, a monounsaturated fatty acid or an aromatic monocarboxylic acid.

The aliphatic monocarboxylic acid is an acid comprising from 2 to 18 carbon atoms.

Examples of aliphatic monocarboxylic acids are acetic acid, propionic acid, butyric acid, isobutyric acid, valeric acid, caproic acid, capric acid, lauric acid, tridecylic acid, myristic acid, palmitic acid, stearic acid and pivalic acid.

The alicyclic monocarboxylic acid is for example cyclohexanecarboxylic acid;

The aromatic monocarboxylic acid is for example benzoic acid, toluic acid, α-/β-naphthalenecarboxylic acid, methylnaphthalenecarboxylic acid and phenylacetic acid and their derivatives.

The monounsaturated fatty acid is for example palmitoleic acid, oleic acid and undecylenic acid.

In one embodiment, the monocarboxylic acid is an aliphatic monocarboxylic acid, more particularly chosen from isobutyric acid, tridecylic acid, myristic acid, palmitic acid, stearic acid and pivalic acid.

In another embodiment, the monocarboxylic acid is a monounsaturated fatty acid, more particularly undecylenic acid.

Diamine Unit C

The diamine C may be an aliphatic diamine as defined for X above, more particularly nonamethylenediamine, decamethylenediamine and dodecamethylenediamine, a cycloaliphatic diamine may be cyclohexanediamine, methylcyclohexanediamine or a cycloaliphatic diamine as defined for X1 above, or an aromatic diamine as defined for X above.

In one embodiment, said diamine is an aliphatic diamine, more particularly hexamethylenediamine.

Triamine Unit D

The triamine D may be an aliphatic triamine such as diethylenetriamine (DETA), bis(hexamethylene)triamine or a polyethertriamine.

The polyethertriamine is for example of formula (I) below:

(I)

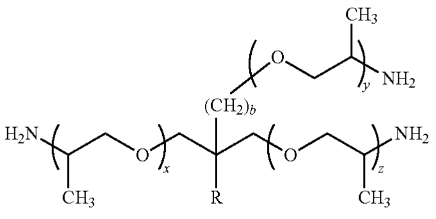

in which R=H or $C_2H_5$, x+y+z is from 4 to 100 and n=0 or 1.

These products are sold especially under the name Jeffamine®.

The triamine is advantageously chosen from diethylenetriamine (DETA), bis(hexamethylene)triamine or a polyethertriamine.

Advantageously, the aliphatic triamine is diethylenetriamine (DETA).

Optional polyetheramide Unit E

The polyetheramide unit is from the polycondensation of at least one polyetherdiamine with at least one aliphatic dicarboxylic acid.

In a first embodiment, the copolymer consists of:

at least one unit (A) chosen from a semicrystalline polyamide unit, at least one monocarboxylic acid unit (B), at least one diamine unit (C), at least one triamine unit (D), where the sum of the constituents A, B, C and D is 100% by weight relative to the total weight of the copolymer.

In this first embodiment:

In a first variant, the copolymer consists of:

at least one unit (A) chosen from a semicrystalline aliphatic polyamide unit, at least one monocarboxylic acid unit (B), at least one diamine unit (C), at least one triamine unit (D), where the sum of the constituents A, B, C, D and E is 100% by weight relative to the total weight of the copolymer.

In a second variant, the copolymer consists of:

at least one unit (A) chosen from a semicrystalline polyamide unit, at least one monocarboxylic acid unit (B) which is undecylenic acid, at least one diamine unit (C), at least one triamine unit (D), where the sum of the constituents A, B, C and D is 100% by weight relative to the total weight of the copolymer.

In a third variant, the copolymer consists of:

at least one unit (A) chosen from a semicrystalline polyamide unit, at least one monocarboxylic acid unit (B), at least one diamine unit (C) which is hexamethylenediamine, at least one triamine unit (D), where the sum of the constituents A, B, C and D is 100% by weight relative to the total weight of the copolymer.

In a fourth variant, the copolymer consists of:

at least one unit (A) chosen from a semicrystalline polyamide unit, at least one monocarboxylic acid unit (B), at least one diamine unit (C), at least one triamine unit (D) which is diethylenetriamine, where the sum of the constituents A, B, C and D is 100% by weight relative to the total weight of the copolymer.

In a fifth variant, the copolymer consists of:

at least one unit (A) chosen from a semicrystalline aliphatic polyamide unit, at least one monocarboxylic acid unit (B) which is undecylenic acid, at least one diamine unit (C), at least one triamine unit (D), where the sum of the constituents A, B, C and D is 100% by weight relative to the total weight of the copolymer.

In a sixth variant, the copolymer consists of:

at least one unit (A) chosen from a semicrystalline aliphatic polyamide unit, at least one monocarboxylic acid unit (B), at least one diamine unit (C) which is hexamethylenediamine, at least one triamine unit (D), where the sum of the constituents A, B, C and D is 100% by weight relative to the total weight of the copolymer.

In a seventh variant, the copolymer consists of:

at least one unit (A) chosen from a semicrystalline aliphatic polyamide unit, at least one monocarboxylic acid unit (B), at least one diamine unit (C), at least one triamine unit (D) which is diethylenetriamine, where the sum of the constituents A, B, C and D is 100% by weight relative to the total weight of the copolymer.

In an eighth variant, the copolymer consists of:

at least one unit (A) chosen from a semicrystalline aliphatic polyamide unit, at least one monocarboxylic acid unit (B) which is undecylenic acid, at least one diamine unit (C) which is hexamethylenediamine, at least one triamine unit (D), where the sum of the constituents A, B, C and D is 100% by weight relative to the total weight of the copolymer.

In a ninth variant, the copolymer consists of:

at least one unit (A) chosen from a semicrystalline aliphatic polyamide unit, at least one monocarboxylic acid unit (B) which is undecylenic acid, at least one diamine unit (C), at least one triamine unit (D) which is diethylenetriamine, where the sum of the constituents A, B, C and D is 100% by weight relative to the total weight of the copolymer.

In a tenth variant, the copolymer consists of:

at least one unit (A) chosen from a semicrystalline aliphatic polyamide unit, at least one monocarboxylic acid unit (B) which is undecylenic acid, at least one diamine unit (C) which is hexamethylenediamine, at least one triamine unit (D) which is diethylenetriamine, where the sum of the constituents A, B, C and D is 100% by weight relative to the total weight of the copolymer.

Advantageously, in these ten variants, the molar proportion of unit A is twice the molar proportion of the sum of unit B and unit C.

Advantageously, in these ten variants, the semicrystalline polyamide is PA11.

Advantageously, in these ten variants, the molar proportion of unit A is twice the molar proportion of the sum of unit B and unit C and the semicrystalline polyamide is PA11.

In a second embodiment, the copolymer consists of:

at least one unit (A) chosen from a semicrystalline polyamide unit, at least one monocarboxylic acid unit (B), at least one diamine unit (C), at least one triamine unit (D), at least one polyetheramide unit (E), where the sum of the constituents A, B, C, D and E is 100% by weight relative to the total weight of the copolymer.

In this second embodiment, the ten variants defined above are also possible.

In these first and second embodiments, the same ten variants also exist for each, except that the polyamide is a semicrystalline semi-aromatic polyamide.

Advantageously, in these latter variants, the molar proportion of unit A is twice the molar proportion of the sum of unit B and unit C.

Advantageously, the semicrystalline semi-aromatic polyamide is chosen from PA6I/6T, PA11/10T, PA BACT/6T and PA11/BACT/6T, PA BACT/10T, PA11/BACT/10T and PA MXD10.

In a third embodiment, the copolymer consists of:

at least one unit (A) chosen from an amorphous polyamide unit, at least one monocarboxylic acid unit (B), at least one diamine unit (C), at least one triamine unit (D), where the sum of the constituents A, B, C and D is 100% by weight relative to the total weight of the copolymer.

In a fourth embodiment, the copolymer consists of:

at least one unit (A) chosen from an amorphous polyamide unit, at least one monocarboxylic acid unit (B), at least one diamine unit (C), at least one triamine unit (D), at least one polyetheramide unit (E), where the sum of the constituents A, B, C, D and E is 100% by weight relative to the total weight of the copolymer.

In these third and fourth embodiments, the ten variants defined for the first and second embodiments also exist, except that the polyamide is an amorphous polyamide.

Advantageously, in the variants of these third and fourth embodiments, the molar proportion of unit A is twice the molar proportion of the sum of unit B and unit C.

Advantageously, the amorphous polyamide is chosen from B10, P10, B12, P12, B14, P14, 11/B10 and copolyamides such as 6/66/12.

Advantageously, the amorphous polyamide is chosen from B10, P10, B12, P12, B14, P14 and 11/B10.

P denotes bis(4-aminocyclohexyl)methane, also called PACM or P in the description.

B denotes bis(4-amino-3-methylcyclohexyl)methane, also called MACM or BMACM or B in the description.

10 denotes decanedioic acid, 12 denotes dodecanedioic acid, 14 denotes tetradecanedioic acid.

11 denotes aminoundecanedioic acid.

Advantageously,

As Regards the Magnetic Composite Material

The magnetic composite material comprises:

4% to 30% by weight of a copolymer as defined above,

70% to 96% by weight of magnetic powder,

0% to 5% by weight of at least one coupling agent,

0% to 5% by weight of at least one additive, where the sum of the copolymer, the magnetic powder, the coupling agent and the additive is 100% by weight, In one embodiment, the magnetic composite material consists of:

4% to 30% by weight of a copolymer as defined above,

70% to 96% by weight of magnetic powder,

0% to 5% by weight of at least one coupling agent,

0% to 5% by weight of at least one additive, where the sum of the copolymer, the magnetic powder, the coupling agent and the additive is 100% by weight.

The Magnetic Powder

The magnetic powder of the magnetic composite material defined above is chosen from iron-nickel-aluminum alloys, ferrites, samarium-cobalt alloys, neodymium-iron-boron alloys, manganese-aluminum-carbon alloys and samarium-iron-nitrogen alloys.

The magnetic powder of the magnetic composite material defined above is advantageously chosen from iron-nickel-aluminum alloys, ferrites, samarium-cobalt alloys, neodymium-iron-boron alloys and manganese-aluminum-carbon alloys.

The Coupling Agent

The magnetic metal powder may be treated beforehand with a coupling agent for improving the adhesion of the powder with the polyamide resin.

Examples of coupling agents are silane compounds, titanate compounds, aluminum compounds, chromium compounds, methacrylate compounds and organic phosphorus compounds such as phosphite esters.

In one embodiment, the coupling agent is present at from 0.1% to 5% by weight.

The Additives

The additives may be any additive well-known to those skilled in the art and more particularly a catalyst, especially H3PO4 and H3PO2, an antioxidant, more particularly a phenolic or phosphoric antioxidant or a hindered amine light stabilizer (HALS), a UV stabilizer and an antifoam.

In one embodiment, talc, graphite and magnesium oxide are excluded from the magnetic composite material.

In another embodiment, Sm—Fe—N is excluded from the magnetic powders and thus from the magnetic composite material.

In yet another embodiment, a dendritic silane-polyamide-amine polymer is excluded from the magnetic composite material.

In a final other embodiment, a lubricant is excluded from the additives and consequently from the magnetic composite material.

The four embodiments defined above may also be combined two by two or else three of the four embodiments may be combined, or else all four of the four embodiments defined above are combined.

In one embodiment, the coupling agent is present at from 0.1% to 5% by weight.

In another aspect, the present invention relates to a process for producing a magnetic composite material as defined above, characterized in that it comprises a step of mixing a copolymer as defined above, in pellet form, with a magnetic powder, more particularly as defined above, and optionally at least one coupling agent and at least one additive.

In one embodiment, said process for producing a magnetic composite material comprises a step of extruding and pelletizing the mixture of magnetic powder with said copolymer in pellet form and optionally the coupling agent and/or the additive.

EXAMPLES

Example 1: Preparation of the Copolymers of the Invention and of Comparative Copolymers

Invention Example I1

An autoclave equipped with a stirrer is charged with 5000 g of 11-aminoundecanoic acid, 11.5 g of diethylenetriamine (DETA), 66 g of hexamethylenediamine (HMDA), 209 g of undecylenic acid, 5 g of Irganox® 1098, 6 g of 85% orthophosphoric acid, 0.2 g of siliconol 1000, and 150 g of water. The reactor is heated to 250 °C (material temperature) under autogenous pressure and with stirring. The conditions are maintained for 1 hour, then the reactor is let down to atmospheric pressure and the temperature is lowered to 240 °C. A purge phase under nitrogen is operated for 30 min before a reduced pressure of 50 mbar is established for 90 min, after which the reactor is emptied.

Invention Example I2

An autoclave equipped with a stirrer is charged with 2000 g of caprolactam, 11.5 g of diethylenetriamine (DETA), 508.96 g of hexamethylenediamine (HMDA), 557.04 g of adipic acid, 2000 g of lauryllactam, 209 g of undecylenic acid, 5 g of Irganox® 1098, 6 g of 85% orthophosphoric acid, 0.2 g of siliconol 1000, and 200 g of water. The reactor is heated to 260 °C (material temperature) under autogenous pressure and with stirring. The conditions are maintained for 4 hours, then the reactor is let down to atmospheric pressure and the temperature is lowered to 240 °C. A purge phase under nitrogen is operated for 30 min before a reduced pressure of 50 mbar is established for 90 min, after which the reactor is emptied.

Counter-Example C1

An autoclave equipped with a stirrer is charged with 5000 g of 11-aminoundecanoic acid, 70 g of lauric acid, 0.2 g of siliconol 1000, and 150 g of water. The reactor is heated to 250 °C (material temperature) under autogenous pressure and with stirring. The conditions are maintained for 1 hour, then the reactor is let down to atmospheric pressure and the temperature is lowered to 240 °C. A purge phase under nitrogen is operated for 30 min before a reduced pressure of 50 mbar is established for 90 min, after which the reactor is emptied.

Counter-Example C2

An autoclave equipped with a stirrer is charged with 1000 g of 11-aminoundecanoic acid, 10 1894 g of decamethylenediamine, 2160 g of sebacic acid, 90 g of stearic acid, 0.2 g of siliconol 1000, and 150 g of water. The reactor is heated to 250 °C (material temperature) under autogenous pressure and with stirring. The conditions are maintained for 1 hour, then the reactor is let down to atmospheric pressure and the temperature is lowered to 240 °C. A purge phase under nitrogen is operated for 30 min before a reduced pressure of 15 50 mbar is established for 90 min, after which the reactor is emptied.

Counter-Example C3

An autoclave equipped with a stirrer is charged with 1100 g of caprolactam, 398.7 g of hexamethylenediamine (HMDA), 581.3 g of adipic acid, 3000 g of lauryllactam, 5 g of Irganox® 1098, 0.2 g of siliconol 1000, and 200 g of water. The reactor is heated to 260 °C (material temperature) under autogenous pressure and with stirring. The conditions are maintained for 4 hours, then the reactor is let down to atmospheric pressure and the temperature is lowered to 240 °C. A purge phase under nitrogen is operated for 30 min before a reduced pressure of 50 mbar is established for 90 min, after which the reactor is emptied.

Counter-Example C4

An autoclave equipped with a stirrer is charged with 1100 g of caprolactam, 710.1 g of hexamethylenediamine (HMDA), 779.9 g of adipic acid, 2500 g of lauryllactam, 5 g of Irganox® 1098, 0.2 g of siliconol 1000, and 200 g of water. The reactor is heated to 260 °C (material temperature) under autogenous pressure and with stirring. The conditions are maintained for 4 hours, then the reactor is let down to atmospheric pressure and the temperature is lowered to 240 °C. A purge phase under nitrogen is operated for 30 min before a reduced pressure of 50 mbar is established for 90 min, after which the reactor is emptied.

Example 2: Analysis of the Acidity and Basicity of the Copolymers of Example 1

The basicity and acidity are determined as described in the text and indicated in Table 1.

TABLE 1

| Examples and Counter-examples | COOH (μeq/g) | Amines (μeq/g) |
|---|---|---|
| Copolymer I1<br>11-Aminoundecanoic acid + undecylenic acid + HMDA + DETA | <10 | 52 |
| Copolymer I2<br>Caprolactam + undecylenic acid + adipic acid + lauryllactam + HMDA + DETA | <10 | 60 |
| C1<br>11-Aminoundecanoic acid + lauric acid | 83 | 20 |
| Copolymer C2<br>11-Aminoundecanoic acid + stearic acid + sebacic acid + decamethylenediamine | 48 | 69 |
| Copolymer C3<br>Caprolactam + adipic acid + lauryllactam + HMDA | 170 | 39 |
| Copolymer C4<br>Caprolactam + adipic acid + lauryllactam + HMDA | 19 | 347 |

Example 3: Rheological Analysis of the Magnetic Composite Materials Obtained by Mixing Comparative and Invention Copolymers With an NdFeB (5/95 weight/weight) Ferrite Powder The polymers of Examples I1, I2 and C1 to C4 are ground in liquid nitrogen and mixed with the magnetic fillers.

After drying at 90 °C under reduced pressure for 12 h, the samples are placed in a rheometer (MCR301) for measurement of the melt viscosity. A 30 min temporal sweep is performed at 1 Hz, 210 °C under nitrogen, between 2 parallel plates 25 mm in diameter.

The initial viscosity corresponds to the measurement after start-up of the rheometer: t0+10 s for recording the measurement.

The viscosity after 30 minutes corresponds to the measurement after 30 minutes of sweep in the rheometer.

Table 2 shows that the copolymers of the invention exhibit stability of viscosity, in contrast to the comparative examples.

TABLE 2

| Magnetic material | Initial viscosity (Pa · s) | Viscosity after 30 min (Pa · s) |
|---|---|---|
| Copolymer I1/NdFeB | 1300 | 3850 |
| Copolymer I2/NdFeB | 1370 | 3920 |
| Copolymer C1/NdFeB | 6398 | 13 390 |
| Copolymer C2/NdFeB | 5620 | 12 350 |
| Copolymer C3/NdFeB | 3970 | 21 800 |
| Copolymer C4/NdFeB | 2710 | 10 000 |

The invention claimed is:

1. A magnetic composite material comprising:

4% to 30% by weight of a copolymer,

70% to 96% by weight of magnetic powder,

0% to 5% by weight of at least one coupling agent,

0% to 5% by weight of at least one additive, where the sum of the copolymer, the magnetic powder, the coupling agent, and the additive is 100% by weight, said copolymer consisting of:

at least one unit (A) chosen from a polyamide unit having an average number of carbon atoms relative to the nitrogen atom of greater than or equal to 6, at least one monocarboxylic acid unit (B), at least one diamine unit (C), at least one triamine unit (D), optionally at least one polyetheramide unit (E), where the sum of the constituents A, B, C, D, and E is 100% by weight relative to the total weight of the copolymer.

2. The magnetic composite material as claimed in claim 1, wherein the copolyamide has an acid chain end content of less than 10 μeq/g.

3. The magnetic composite material as claimed in claim 1, wherein the copolyamide has an amine chain end content of less than 80 μeq/g.

4. The magnetic composite material as claimed in claim 1, wherein the polyamide unit is from the polycondensation of at least one lactam, or of at least one aminocarboxylic acid, or of at least one diamine with at least one dicarboxylic acid.

5. The magnetic composite material as claimed in claim 4, wherein the polyamide unit is from the polycondensation of at least one lactam, or of at least one aminocarboxylic acid, or of at least one aliphatic diamine with at least one aliphatic dicarboxylic acid.

6. The magnetic composite material as claimed in claim 1, wherein the polyamide is a semicrystalline aliphatic polyamide.

7. The magnetic composite material as claimed in claim 6, wherein the semicrystalline aliphatic polyamide is chosen from PA6, PA66, PA11 and PA12 or a mixture thereof or a copolyamide thereof.

8. The magnetic composite material as claimed in claim 6, characterized in that the polyamide is chosen from PA11 and PA12.

9. The magnetic composite material as claimed in claim 1, wherein the polyamide is an amorphous polyamide.

10. The magnetic composite material as claimed in claim 1, wherein the polyetheramide unit is from the polycondensation of at least one polyetherdiamine with at least one aliphatic dicarboxylic acid.

11. The magnetic composite material as claimed in claim 1, wherein said monocarboxylic acid unit (B) is chosen from aliphatic monocarboxylic acids.

12. The magnetic composite material as claimed in claim 1, wherein said monocarboxylic acid unit (B) is chosen from monounsaturated fatty acids.

13. The magnetic composite material as claimed in claim 12, wherein the monounsaturated fatty acid is undecylenic acid.

14. The magnetic composite material as claimed in claim 1, wherein said diamine is an aliphatic diamine.

15. The magnetic composite material as claimed in claim 1, wherein said triamine is chosen from diethylenetriamine (DETA), bis (hexamethylene) triamine or a polyethertriamine.

16. The magnetic composite material as claimed in claim 1, wherein the magnetic powder is chosen from iron-nickel-aluminum alloys, ferrites, samarium-cobalt alloys, neodymium-iron-boron alloys, manganese-aluminum-carbon alloys and samarium-iron-nitrogen alloys.

17. A process for producing a magnetic composite material as claimed in claim 1, wherein the method comprises a step of mixing the copolymer, in pellet form, with a magnetic powder, and optionally at least one coupling agent and at least one additive.

18. The process for producing a magnetic composite material as claimed in claim 17, wherein the process comprises a step of extruding and pelletizing the mixture of magnetic powder with said copolymer in pellet form and optionally the coupling agent and/or the additive.

19. The magnetic composite material as claimed in claim 1, wherein the polyamide is chosen from 11/B10, 12/B10, 11/P10, 12/P10, 11/BI/BT, 12/BI/BT, 11/PI/BT, 12/PI/BT, 11/PI/PT, 12/PI/PT, 11/BI, 12/BI, 11/PI and 12/PI.

* * * * *